Patented May 3, 1927.

1,627,342

UNITED STATES PATENT OFFICE.

THEODOR SABALITSCHKA, OF BERLIN-STEGLITZ, GERMANY.

PROCESS OF PRESERVING FOOD FOR MEN OR ANIMALS.

No Drawing. Application filed April 8, 1925, Serial No. 21,694, and in Germany April 17, 1924.

My invention relates to improvements in the process of preserving food for men or animals. Heretofore benzoic acid, salicylic acid, chloro-benzoic acid and other carbocyclic acids and the salts thereof have been used for preserving food. It is known that in such compounds only the free acids have the preserving property, while in neutral or alkaline media the salts have hardly any preserving action, and they preserve only in acid media, where they are decomposed thus forming free acids. In alkaline media even the free acids have no action, because they combine with alkalies to form salts.

I have discovered that preserving agents which are independent of the reaction (alkalinity, neutrality or acidity) of the medium, and which have under any conditions the same preserving property are the alcohol esters (or alkyl esters, but not the phenol esters) of the preserving acids, which esters are not affected by the acid or alkaline media, and which in part have a better preserving action than the acids. For example, when adding 0.07% of p-oxy-benzoic acid methyl ester to boiled fruit, broth, or the like, the growth of fungi and bacteria is prevented, and it is immaterial whether the said substances are acid, neutral, or alkaline. Generally speaking, alkyl groups, and more particularly the methyl group, raise the disinfecting property of the carbocyclic carboxylic acids, so that the preserving effect is increased by transforming the acids into the esters. Further, as distinguished from the phenol esters of the same acids, most of the said groups have a weak taste of their own, so that they do not impair the good taste of the matter to be preserved.

For complete preserving the following amounts of my improved preserving media are sufficient:

I. Cinnamic acid: $C_6H_5.CH.COOH$, free acid 0.28%, its methyl ester 0.03%.

II. Anisic acid: $CH_3O.C_6H_4.COOH$, free acid 0.14%, its methylic ester 0.07%.

III. Para-oxy-benzoic acid:

$$HO.C_6H_4.COOH,$$

free acid 0.68%, its methyl ester 0.07%.

IV. Meta-oxy-benzoic acid: free acid 0.68%, its methylic ester 0.07%.

In the above table, I have also stated the amounts of the corresponding acids, in the free state, necessary to effect preservation, to give an idea of the higher efficiency of the present invention.

When used in the above concentration the p-oxy-benzoic acid methyl ester does not in any way impair the taste of the food, and it is not obnoxious to health. An important feature of my improved preserving medium is that the color and the consistency of the food are not changed, while sometimes the acid reaction of the free acids changes the food in these respects.

*Example 1.*—Fresh marmalade is cooled, whereupon 0.7 grammes of p-oxy-benzoic acid methyl ester per kilogramme are added and uniformly distributed.

*Example 2.*—To fresh or boiled milk 0.5 grammes of p-oxybenzoic acid methyl ester per liter are added.

*Example 3.*—Eggs are preserved in water containing 0.08% of p-oxy-benzoic acid ester. No claim is made herein to the use of methyl and like alkyl esters of benzoic acid or to the use of methyl and like esters of salicylic acid, which esters do not possess substantially greater preservative power than the free acids.

I claim:

1. The herein described process of preserving food for men and animals, which consists in adding to the food, those non-poisonous alcohol esters of the aromatic carboxylic acids, which do not possess a strong taste, and which esters have a much stronger preservative property than the corresponding acids in the free state.

2. The herein described process of preserving food for men and animals, which consists in adding to the food p-oxy-benzoic acid methyl ester.

In testimony whereof I hereunto affix my signature.

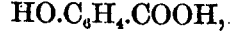
TH. SABALITSCHKA.